United States Patent
Bahlo

(10) Patent No.: US 12,488,642 B2
(45) Date of Patent: Dec. 2, 2025

(54) METHOD FOR DETERMINING ACTUAL EMISSION VALUES FOR A VEHICLE

(71) Applicant: Robert Bosch GmbH, Stuttgart (DE)

(72) Inventor: Jan Bahlo, Maulbronn (DE)

(73) Assignee: Robert Bosch GmbH, Stuttgart (DE)

( * ) Notice: Subject to any disclaimer, the term of this patent is extended or adjusted under 35 U.S.C. 154(b) by 250 days.

(21) Appl. No.: 18/169,929

(22) Filed: Feb. 16, 2023

(65) Prior Publication Data

US 2023/0260344 A1    Aug. 17, 2023

(30) Foreign Application Priority Data

Feb. 17, 2022    (DE) ................. 10 2022 201 646.7

(51) Int. Cl.
    *G07C 5/08*       (2006.01)
    *G07C 5/00*       (2006.01)

(52) U.S. Cl.
    CPC ............. *G07C 5/085* (2013.01); *G07C 5/008* (2013.01); *G07C 5/0808* (2013.01)

(58) Field of Classification Search
    CPC ...... G07C 5/085; G07C 5/008; G07C 5/0808; G07C 5/0841; G06Q 50/40; G06Q 10/20; G06Q 30/0283; G06Q 30/04; G06Q 50/06; G06Q 2220/00; B60L 2260/52; B60L 53/665; B60L 2270/12; Y02T 10/70; Y02T 10/7072; Y02T 90/12; Y02T 90/16; B60W 20/15
See application file for complete search history.

(56) References Cited

U.S. PATENT DOCUMENTS

| | | | | |
|---|---|---|---|---|
| 8,280,646 | B2* | 10/2012 | Seidel | G06Q 50/06 73/23.31 |
| 11,904,721 | B2* | 2/2024 | Dietz | G06Q 20/3827 |
| 2009/0096416 | A1 | 4/2009 | Tonegawa et al. | |
| 2010/0228601 | A1* | 9/2010 | Vaswani | G06Q 10/30 705/308 |
| 2011/0307130 | A1* | 12/2011 | Gow | B60L 3/102 701/22 |
| 2020/0089909 | A1* | 3/2020 | Kim | G06F 21/44 |

(Continued)

FOREIGN PATENT DOCUMENTS

| | | |
|---|---|---|
| DE | 102008041396 A1 | 2/2010 |
| DE | 102013220935 A1 | 4/2015 |
| DE | 102019212041 A1 | 2/2021 |

(Continued)

OTHER PUBLICATIONS

WO-2021028140-A1 English Translation (Year: 2024).*

*Primary Examiner* — Rami Khatib

(74) *Attorney, Agent, or Firm* — Michael Best & Friedrich LLP

(57) ABSTRACT

A method for determining actual emission values for a vehicle, comprising receiving a certificate file, which comprises data regarding manufacturing-related emissions of an energy source charged during a charging or refueling operation of a vehicle or a charged electrical current, from a supply point that supplies the energy source or current; and storing the certificate file along with at least one piece of information regarding the charged current amount or energy source amount. By means of the information in the certificate file, the actual emissions for a distance can be calculated.

12 Claims, 1 Drawing Sheet

(56) References Cited

U.S. PATENT DOCUMENTS

2021/0333118 A1* 10/2021 O'Neill ................. H04W 4/46
2023/0177522 A1*  6/2023 Schönhals .............. G07C 5/008
                                                    705/317

FOREIGN PATENT DOCUMENTS

| DE | 102020001782 | A1 |   | 9/2021 | | |
| DE | 102020120577 | A1 |   | 2/2022 | | |
| JP | 2017178075 | A |   | 10/2017 | | |
| WO | WO-2021028140 | A1 | * | 2/2021 | ............. | B60L 15/00 |

* cited by examiner

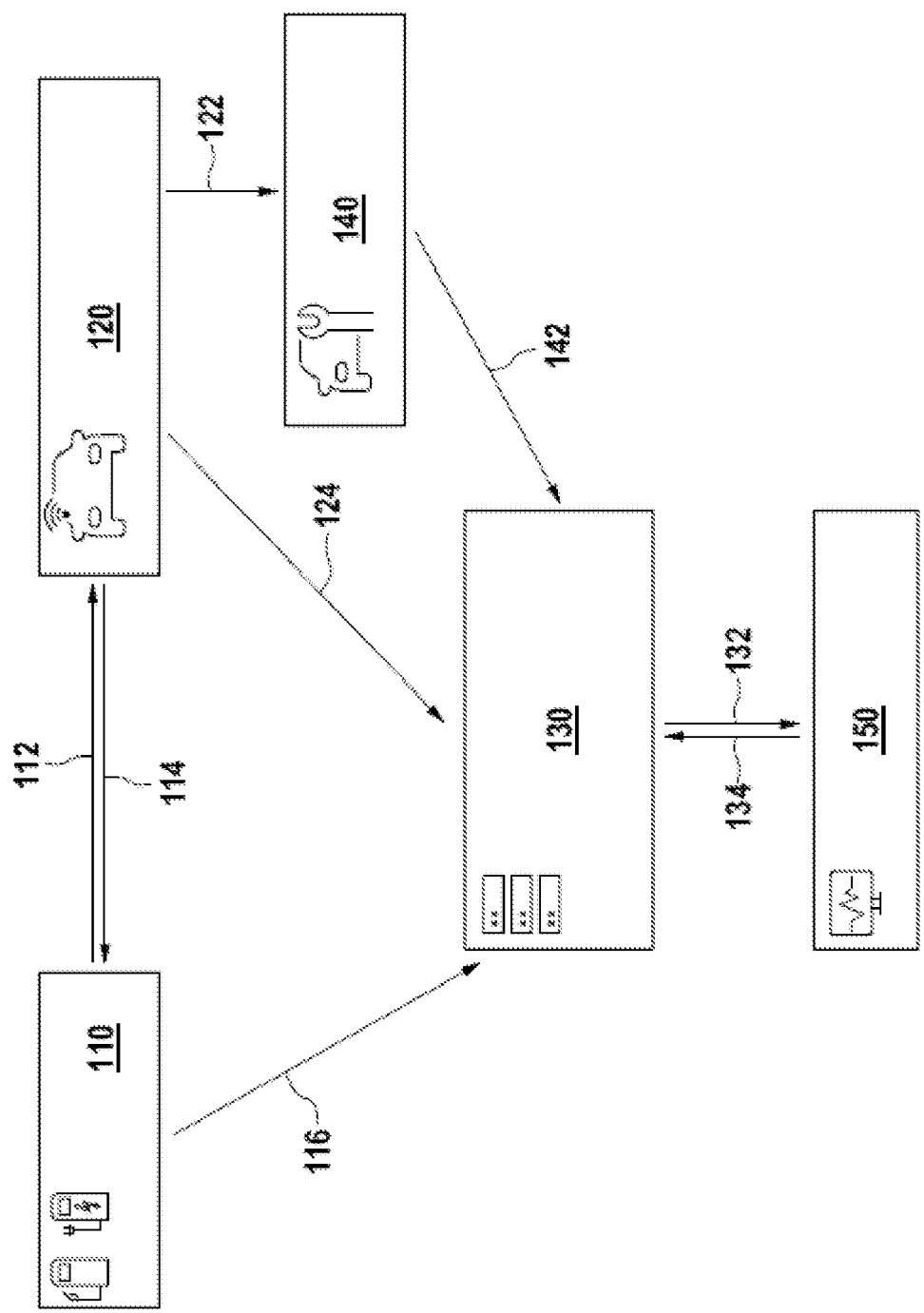

METHOD FOR DETERMINING ACTUAL EMISSION VALUES FOR A VEHICLE

BACKGROUND OF THE INVENTION

The present invention relates to a method for determining actual emission values for a vehicle, as well as a computing unit and a computer program for carrying out the method.

The energy consumption of vehicles, as well as the associated emissions, e.g. the $CO_2$ emissions, are of great interest. In some cases, the capturing of such values is possible by on-board monitoring systems (OBM), in order to be able to capture data regarding fuel consumption and the associated emissions in real-world operation, for example, even across fleets. Vehicles are able to capture vehicle-specific parameters and transmit them to a central point, e.g. to a manufacturer or an official entity. A unidirectional transmission of the data regarding the consumption to the receiving unit is usually carried out. However, in the case of $CO_2$ emissions, only the locally-generated emission value produced in the vehicle is usually considered, which is caused, for example, by the combustion of fuel.

SUMMARY OF THE INVENTION

According to the invention, a method for determining actual emission values for a vehicle, as well as a computing unit and a computer program for carrying out the method are proposed.

The invention offers a possibility for actual emission values to be determined in vehicles with an electric drive (fully electric or hybrid), which can in particular be determined for emissions with an external current/fuel generation. In particular, the invention makes use of so-called emissions certificates that are loaded into the vehicle when charging/refueling.

Specifically, a method for determining actual emission values for a vehicle is proposed, having the following steps: receiving a certificate file, which comprises data regarding manufacturing-related emissions of an energy source charged during a charging or refueling operation of a vehicle or a charged electrical current, from a supply point (e.g. a charging or refueling column) that supplies the energy source or current; and storing the certificate file along with at least one piece of information regarding the charged current amount or energy source amount. Thus, for example, the certificate can attest to the $CO_2$ balance of the energy provided ($CO_2$ equivalent) so that it can be included in the consumption and emissions balance of the vehicle for various purposes. While under currently customary methods, only the proportion of emissions occurring directly in the vehicle is usually considered and the electrical energy in electric or hybrid vehicles or the hydrogen added in fuel cell vehicles ("tank-to-wheel" consideration) is considered to be emission-free, a correct overall emission balance can thus be produced ("well-to-wheel" consideration). This can be used, for example, in order to monitor and comply with emissions targets (e.g. $CO_2$ limits) of the vehicle manufacturer, fleet operator, or even at the national level.

The method can further comprise transmitting one or more stored certificate files to the supply point and/or to a central trusted entity and/or to a diagnostic device. Depending on the nature, the transmission can be carried out continuously or within the scope of a cyclical inspection (e.g. regular main inspection or the like), but can also be carried out based on a request or other triggering conditions.

In particular, as part of the method, it is possible to determine a consumption amount of at least one energy source or electrical current for a predefined distance traveled of the vehicle, and to transmit the consumption amount and/or the distance traveled along with at least the stored certificate files for the consumption amount of the energy source or electrical current. Based on this, for example, it is possible to set up a user-specific $CO_2$ taxation and thus directly support the energy-efficient driving and/or use of $CO_2$-poor and $CO_2$-free current sources or electrical current.

It is further possible to determine a consumption amount of at least one energy source or electrical current for a predefined distance traveled of the vehicle, and then (e.g. directly in a suitable control unit in the vehicle) determine an emission value for the predefined distance traveled based on the determined consumption amount and the data of the associated certificate file for the at least one energy source or electrical current.

In particular, this also provides the possibility of determining the consumption amount for all drives used for the predefined distance traveled and calculating all emission values for the predefined distance traveled and thus ultimately determining an overall emission value as the sum of all calculated emission values for the distance traveled. This total emission value can then include both locally generated emissions (internal combustion engine, emissions from combustion of fuel) as well as emissions created in the production of the energy source.

Such a calculated emission value (or multiple emission values) can then be communicated, for example, to the supply point, to a central trusted entity, and/or to a diagnostic device.

For example, the certificate file can be transmitted from the supply point via a wireless interface or via a powerline communication interface. This can be a specific interface, but, particularly preferably, an interface can be used that is already used for communication with the vehicle, e.g. for charging control.

For example, the vehicle could use one or more of the following energy sources for the drive: Diesel, gasoline, hydrogen, electric current. Thus, it could be an electric vehicle, an electric hybrid vehicle, or a fuel cell vehicle, among other things.

It is also preferred that the certificate file be encrypted and/or authenticated via a cryptographic method. For example, asymmetric keys can be used as well as an authentication of the certificates by a trusted entity.

A computing unit according to the invention, e.g. a control unit of a vehicle, is configured, in particular in terms of program technology, so as to carry out a method according to the invention.

The implementation of a method according to the invention in the form of a computer program or computer program product with program code for carrying out all method steps is also advantageous since this results in particularly low costs, in particular if an executing control unit is also used for further tasks and is therefore already present. Lastly, a machine-readable storage medium is provided, on which the computer program is stored as described above. Suitable storage media or data carriers for providing the computer program are in particular magnetic, optical and electrical memories such as hard disks, flash memory, EEPROMs, DVDs, etc. Downloading a program via computer networks (Internet, Intranet, etc.) is possible as well. Such a download can be wired or cabled or wireless (e.g. via a WLAN, a 3G, 4G, 5G or 6G connection, etc.).

Further advantages and configurations of the invention will emerge from the description and the accompanying drawing.

BRIEF DESCRIPTION OF THE DRAWING

The invention is illustrated schematically in the drawing on the basis of embodiment examples and is described in detail in the following with reference to the drawing.

FIG. 1 shows a schematic overview of the points involved and the data pathways according to possible embodiments for exchanging emissions-related certificate files.

DETAILED DESCRIPTION

The explanations below can generally be used with vehicles of all types of drives, for example, purely electric vehicles as well as vehicles with plug-in hybrid technology (PHEV) or with a fuel cell drive. Many of these vehicles already have at least one bi-directional communication interface that enables communication between vehicle controllers and an energy-supplying device such as an electrical charging station. Such interfaces are used, for example, for the charging control unit. This can be done for electric drives, for example via powerline communication (PLC), i.e. via signals modulated on the current line, or via wireless interfaces on both sides. However, a separate interface can generally also be used for the methods described herein.

In the context of a charging or refueling operation, a certificate can then additionally be transmitted to the vehicle, which indicates a specific emission balance (e.g. a $CO_2$ balance) of the obtained energy source or the obtained electrical energy, e.g. the charging current used or the hydrogen supplied. This certificate can be received and stored by the vehicle control unit or another suitable control unit, e.g. the OBM unit. Based on this certificate and the distances traveled between each of the refueling or charging operations, an actual emission value can then be determined for those paths. This determination of the emission values can generally be done at any point, e.g. directly in a control unit of the vehicle, but also at a local or central point, to which the certificate can be transmitted along with the required travel data.

FIG. 1 shows a schematic overview of the points involved and the data pathways according to possible embodiments.

Here, a corresponding certificate is preferably provided by the energy supplier (e.g. a current provider) and stored locally at the supply point 110 which allows the charging or refueling for later access. Alternatively or additionally, the supply point 110 (i.e. the charging column or dispensing station) can also be connected to a central point or to a server of the energy supplier via communication networks, from which updated certificates for the currently valid energy mix with the associated emission values can then be accessed at any time.

At the start of a charging or refueling operation, in addition to the usual control data, the certificate can then be transmitted as a file from the supply point to the control unit of the vehicle 120 via a suitable communication protocol (connection 112). The communication with the vehicle 120 can be automatically initiated if a suitable interface is detected; alternatively, a vehicle control unit provided with the required bi-directional interfaces and devices can also transmit a request to the supply point 110 in the form of a suitable signal or message, whereupon the certificate is transmitted to the control unit of the vehicle. In the vehicle, the certificate can then be stored in a suitable memory unit.

Preferably, the communication between the supply point 110 and the vehicle control 120 is tamper-resistant via suitable cryptographic methods, e.g. via asymmetric encryption methods. The certificate can in particular be configured as a digital cryptographic certificate, which can then be checked via a central trusted entity, e.g. by transmitting the associated public key from the trusted instance (trusted platform) to the vehicle control unit. The usage and testing of such digital certificates is known in the prior art and is not further explained herein. Moreover, the usage and storage in the vehicle can also be designed so as to be tamper-resistant, for example, by using suitable hardware such as a hardware security module, HSM, or a Trusted Platform Module TPM with integrated cryptographic keys.

The certificate is to comprise at least one piece of data regarding the emission balance of the charged electrical energy or the charged energy source. Additionally, further data can optionally be included, such as a timestamp regarding the charging time, a provider identifier, a supply point/charging point identifier, or others. This data, such as vendors or timestamps, can also be stored separately in the vehicle along with the certificate.

It is then possible to transmit one or more of the certificates stored in the vehicle to any point. The certificates can be utilized there in order to bring about an overall energy balance of the vehicle. However, certificates can also be submitted in order to verify them. For example, in the presence of a bi-directional communication interface in the vehicle to the supply point 110, it can also be provided that all certificates currently stored in the vehicle 120 are transmitted to the supply point 110 during charging (connection 114), from where they can then be transmitted to, for example, a central point 130 (connection 116).

Likewise, certificates and/or related consumption and emissions information can be communicated to readers 140 during a main inspection or vehicle diagnostics, e.g. at a workshop (connection 122). From there, for example, it can also be transmitted to the central point 130 (connection 142).

Moreover, the certificates can also be transmitted directly from the vehicle to a central point 130 (connection 124).

If it is provided that the certificates in an external unit outside the vehicle are to be used for determining the emissions balance, the vehicle can also transmit information regarding the distances traveled and energy consumption during these distances. It can be determined that the transmission of the certificates and information regarding consumption is carried out cyclically at predefined times, e.g. once daily or once monthly. In other embodiments, it is also possible to store the certificates respectively at or after a refueling or charging operation so that the distances traveled are respectively considered between two charging operations and can be saved or checked together with the certificate. A requested retrieval of the stored certificates is also possible, such as by a diagnostic device 140. In all cases, it can be provided that all stored certificates are transmitted; alternatively, only certificates for a specific time period, a specific distance, and/or a specific energy source or provider can be transmitted.

Alternatively, the calculation of the emission balance per energy source or a summed total emission balance of the vehicle can also be carried out directly in the vehicle, preferably after cryptographic checking of the available certificates. Here, too, a distance traveled, along with data regarding energy consumption, e.g. the amount of energy recharged in a charging operation, can be used in order to determine the total consumption. For example, in a hybrid vehicle, the consumption of electrical current which has been fed from the outside via loading processes and the fuel consumption in the internal combustion engine is determined over a defined distance, and then, from the known in-vehicle diagnostic methods, the measured or calculated $CO_2$ emissions of the internal combustion engine and the manufacturing-related $CO_2$ emissions of the consumed current are added to an overall emission value. The results of the calculation can be used in the vehicle, e.g. in order to adjust the control of the drivetrains or to comply with certain defined limits, or to display the consumption and emission values to the user for informational purposes; alternatively or additionally, the results can also be communicated to readers 140 at other points, such as the central point 130, during a main examination or vehicle diagnostics, or to a monitoring point 150 established by law. Generally, the certificates themselves and/or results obtained based on the certificates can be transmitted.

In order to transmit the certificates or to exchange cryptographic keys and other additional information from the vehicle to a central point, to a diagnostics device/workshop 140, or to the supply point 110, any suitable communication interfaces can be used again, such as a cellular interface, a diagnostic interface for reading out and exchanging control data, a local radio interface (WLAN, Bluetooth), or others.

In all operations that take place during the charging process, the time of transmission of data can of course be selected appropriately; thus, the transmission of a certificate can occur immediately at the start of a refueling or charging operation, or at any suitable time during the charging operation. Alternatively, a certificate can also be transmitted only after the end of the operation, if it is ensured that the communication connection to the vehicle is still maintained at that time.

The certificates transmitted by vehicles can be stored in the central point 130, preferably along with a unique code for identifying the vehicle that has transmitted the certificates. Optionally, from there, they can also be further transmitted to another point 150, such as an authority, a fleet operator, or the manufacturer (connection 132). There, for example, compliance with statutory limits for individual vehicles, or averaged over a plurality of vehicles, can be recorded. Additionally, or alternatively, such other points 150 can also transmit data regarding certificate creation, certificate verification, or consumption back to the central point 130 (connection 134).

The invention claimed is:

1. A method for determining actual emission values for a vehicle (120), comprising:
   receiving (112) at the vehicle (120) a certificate file from a supply point (110), which comprises data regarding manufacturing-related $CO_2$ emissions of a consumed current of an energy source charged during a charging or refueling operation of a vehicle (120) or a charged electrical current that are added to an emission value, from the supply point (110) that supplies the energy source or current;
   storing the certificate file at the vehicle (120) along with at least one piece of information regarding the charged current amount or energy source amount;
   transmitting the stored certificate file from the vehicle (120) to at least one of the following: to a central trusted entity (130), and/or to a diagnostic device (140);
   determining a consumption amount at the supply point (110) of at least one energy source or electrical current for a predefined distance traveled of the vehicle (120);
   calculating the emission value at the vehicle (120) for the predefined distance traveled based on the determined consumption amount and the data of the associated certificate file for the at least one energy source or electrical current; and
   controlling drivetrains of the vehicle (120) based on the emission value.

2. The method according to claim 1, further comprising:
   determining a consumption amount at the supply point (110) of at least one energy source or electrical current for a predefined distance traveled of the vehicle, and
   communicating (124) the consumption amount and the predefined distance traveled along with at least the stored certificate files for the consumption amount of the energy source or electrical current from the supply point (110) to the vehicle (120).

3. The method according to claim 1, further comprising:
   calculating the consumption amount for all drives used for the predefined distance traveled;
   calculating all emission values for the predefined distance traveled; and
   forming a total emission value as the sum of all calculated emission values for the predefined distance traveled.

4. The method according to claim 1, further comprising:
   transmitting one or more calculated emission values to at least one of the following: to the central trusted entity, and/or to the diagnostic device.

5. The method according to claim 1, wherein the certificate file is transmitted from the supply point via a wireless or wired communication interface (112).

6. The method according to claim 1, wherein the vehicle uses one or more of the following energy sources as a drive: diesel, gasoline, hydrogen, electric current.

7. The method according to claim 1, wherein the certificate file is encrypted and/or authenticated via a cryptographic method.

8. The method according to claim 1, wherein the certificate file includes a timestamp regarding a charging time, a provider identifier, and a supply point/charging point identifier.

9. A system including:
   a computing unit disposed in a vehicle (120) configured to:
   receive (112) a certificate file from a supply point (110), which comprises data regarding manufacturing-related $CO_2$ emissions of a consumed current of an energy source charged during a charging or refueling operation of the vehicle (120) or a charged electrical current that are added to an emission value, from the supply point (110) that supplies the energy source or current;
   store the certificate file at the vehicle (120) along with at least one piece of information regarding the charged current amount or energy source amount;
   transmit the stored certificate file from the vehicle (120) to at least one of the following: to a central trusted entity (130), and/or to a diagnostic device (140);
   determine a consumption amount at the supply point (110) of at least one energy source or electrical current for a predefined distance traveled of the vehicle;
   calculate the emission value at the vehicle (120) for the predefined distance traveled based on the determined consumption amount and the data of the associated certificate file for the at least one energy source or electrical current; and
   control drivetrains of the vehicle (120) based on the emission value.

10. The system according to claim 9, wherein the computing unit (120) is configured to encrypt and/or authenticate the certificate file.

11. A non-transitory computer-readable medium including instructions executable by an electronic processor disposed in a vehicle (120) to perform a set of functions, the set of functions comprising:
- receiving (112) a certificate file from a supply point (110), which comprises data regarding manufacturing-related $CO_2$ emissions of a consumed current of an energy source charged during a charging or refueling operation of a vehicle (120) or a charged electrical current that are added to an emission value, from the supply point (110) that supplies the energy source or current;
- storing the certificate file along with at least one piece of information regarding the charged current amount or energy source amount;
- transmitting the stored certificate file from the vehicle (120) to at least one of the following: to a central trusted entity (130), and/or to a diagnostic device (140);
- determining a consumption amount at the supply point (110) of at least one energy source or electrical current for a predefined distance traveled of the vehicle;
- calculating the emission value at the vehicle (120) for the predefined distance traveled based on the determined consumption amount and the data of the associated certificate file for the at least one energy source or electrical current; and
- controlling drivetrains of the vehicle (120) based on the emission value.

12. The non-transitory computer-readable medium according to claim 11, wherein the set of functions executable by the electronic processor further includes:
- encrypting and/or authenticating the certificate file.

* * * * *